Oct. 24, 1939.  J. B. MENTON ET AL  2,176,975
WINDSHIELD REGULATOR
Filed April 22, 1938
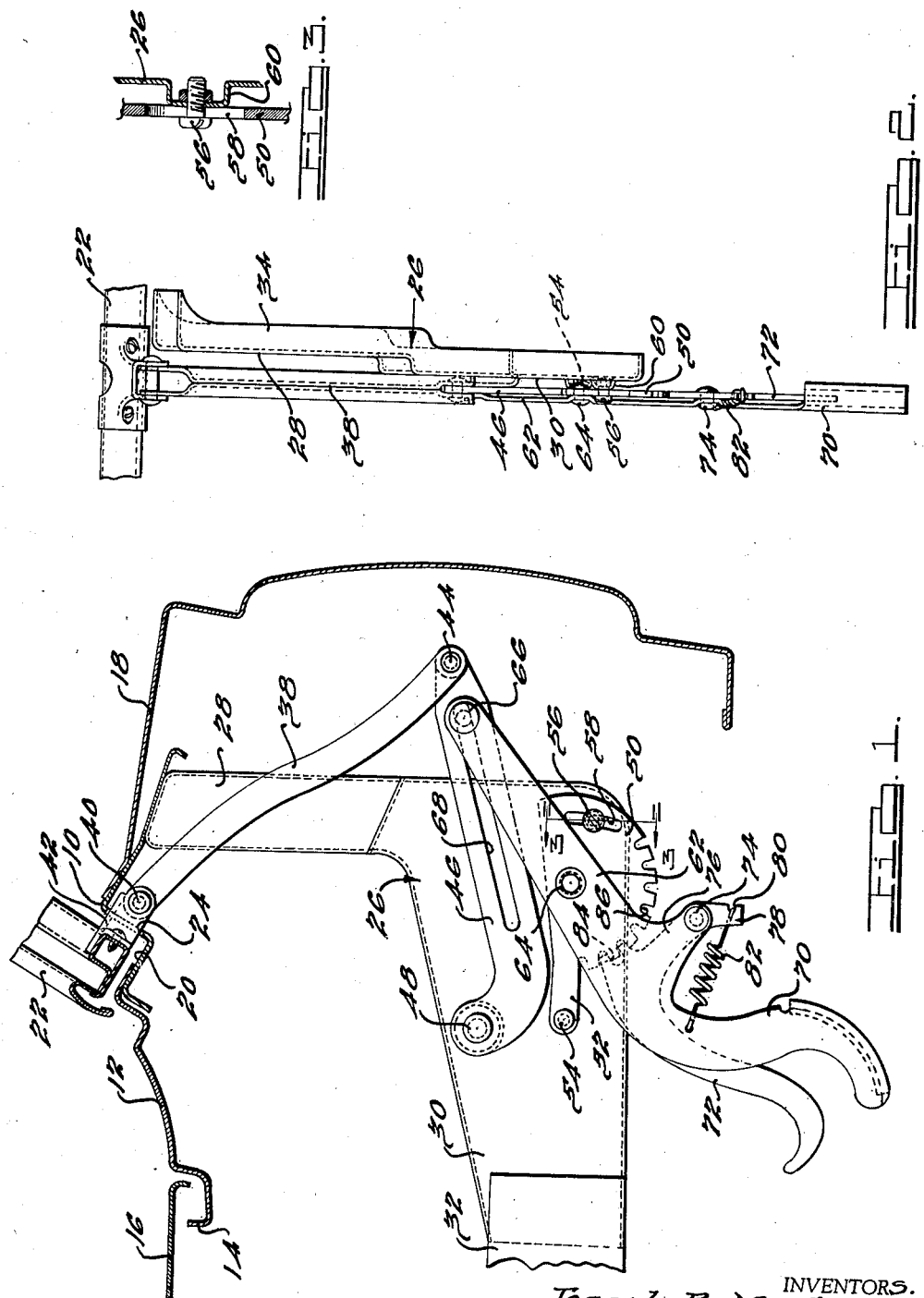
INVENTORS.
Joseph B. Menton,
BY Bernard W. Benz.
Harness, Dickey & Pierce.
ATTORNEYS.

Patented Oct. 24, 1939

2,176,975

UNITED STATES PATENT OFFICE 2,176,975

WINDSHIELD REGULATOR

Joseph B. Menton and Bernard W. Benz, Detroit, Mich., assignors to The Murray Corporation of America, Detroit, Mich., a corporation of Delaware Application April 22, 1938, Serial No. 203,528

7 Claims. (Cl. 296—84)

This invention relates to improved windshield opening and closing regulators and particularly to a regulator of the concealed type capable of retaining the windshield at any point between complete open and closed positions through the operation of an operating lever mechanism.

One of the primary objects of the present invention is to provide an improved windshield regulator structure which is simple in construction and which is economical to manufacture.

A further object of the present invention is to provide a simplified windshield regulator structure which is positive in its action and which is easily operated.

Another object of the invention is to provide an improved window regulator mechanism which is concealed from normal vision but which is readily accessible to the vehicle operator.

Other objects of the invention will become apparent from the following specification, the drawing relating thereto and from the claims hereinafter set forth.

In the drawing in which like numerals are used to designate like parts in the several views throughout:

Figure 1 is a fragmentary, vertical cross-sectional view, showing part in elevation, taken at substantially the transverse center of a part of an automotive vehicle having a window regulating mechanism according to the present invention associated therewith;

Fig. 2 is a rear elevational view of the regulating mechanism illustrated in Fig. 1;

Fig. 3 is a fragmentary, cross-sectional view on a slightly enlarged scale taken substantially along the line 3—3 of Fig. 1.

Referring to the drawing, a part of an automotive vehicle is illustrated including a transversely extending cowl bar 10, a cowl 12 fixed thereto having the usual cowl opening 14 therethrough which is adapted to be covered by the usual cowl closure member 16. The usual transversely extending instrument panel 18 is fixed to the cowl bar and extends downwardly within the front passenger compartment of the vehicle in the usual way.

The cowl bar 10 is formed with a rabbet 20 for receiving the frame of a windshield 22. The windshield 22 includes the usual sheet of glass having a frame therearound which may be either of the straight or U-type. Suitable sealing means, not shown, may be provided between the windshield and the edges of the vehicle opening so as to seal the opening when the windshield is closed.

An opening 24 is provided through the cowl bar 10 at substantially the transverse center of the vehicle through which the operating mechanism is adapted to extend for opening and closing the windshield.

A generally L-shaped supporting member 26 lies in a substantially vertical plane and has its upwardly directed leg 28 fixedly secured to the under surface of the cowl bar by spot welding or the like, and has its forwardly directed leg 30 suitably secured to a rigid strap 32 which may be fixed to the dash panel (not shown). The support member 26 is preferably stamped out of relatively light sheet metal material and is provided with edge flanges 34 completely around the edges thereof so as to stiffen and provide a rigid supporting structure. The leg 28 is preferably offset from the plane of the leg 30 so that there is no interference between certain parts of the opening and closing mechanism with the supporting member.

The opening and closing mechanism comprises a linkage mechanism which lies in a substantially vertical plane and includes an elongated link member 38 which is pivotally connected at 40 to a bracket 42. The bracket 42 is fixedly secured to the frame 22 of the windshield at substantially the transverse center thereof and is adapted to extend through the opening 24 when the windshield is in its closed position. The lower end of the link member 38 is pivotally connected at 44 to another elongated link member 46, which in turn is pivotally connected at 48 to the leg 30 of the support member 26.

Another mounting or supporting member 50, in the form of a segment having a forwardly directed extension 52 thereon, is pivotally connected by a pivot pin 54 to a boss 56 on the leg 30 of the member 26. The member 50 may be adjusted relative to the support 30 about the fixed pivot pin 54 by means of a screw 56 which extends through an elongated curved slot 56 in the member 50 and which is adapted to be engaged by a nut within a boss 60 on the member 26 adjacent the rear edge thereof. By releasing the screw 56, the member 50 may be pivoted about the pivot pin 54 through the slot 58, so that the member 50 may be pivotally adjusted relative to the support 30.

A lever member 62 is pivotally secured to the member 50 by means of a pivot pin 64, so that the lever arm 62 moves with the member 50 as it is adjusted about its pivot point 54. The lever member 62 is pivotally and slidably connected to the link member 46 by means of a pivot pin 66, which is slidably received within an elongated, longitudinally extending slot 68 in the link member 46.

The lever member 62 has a downwardly and forwardly directed curved handle portion 70, which is adapted to extend slightly below the lower edge of the instrument panel 18, so that it may be readily grasped by the vehicle operator for operating the opening and closing mechanism. By drawing the handle portion 70 toward the operator, the lever arm 62 is caused to pivot about its pivot 64 and the pivot pin 66 rides within the slot 68 and causes the linkage member 38 to move outwardly through the opening 24 to open the windshield 22.

In order to hold the window in its desired position, a releasable locking member is provided which includes a trigger member 72 which is pivotally attached by a pivot pin 74 to a projection 76 formed integral with the lever member 62 adjacent the handle portion 70. The member 72 has a downwardly directed extension 78 formed integral therewith which is notched at 80 for the reception of one end of a tension spring 82. The opposite end of the spring is fixedly attached to the handle portion 70 so that teeth 84 formed on the member 72 are resiliently urged into cooperating grooves 86 formed along the lower curved edge of the segment member 50. When the teeth 84 are received within the desired notches 86 in the segment member 50, the opening and closing mechanism is locked against movement and the window is held in position until the member 72 is grasped by the fingers of the operator and the teeth 84 are removed from engagement with the grooves 86. When the teeth are out of engagement with the grooves, the linkage mechanism may be actuated to open or close the windshield.

It is evident from the above that the present invention provides an improved and simplified window operating structure having a number of advantages. One such advantage is that by the position and arrangement of the trigger member 72 adjacent the handle portion 70, both the trigger member and the handle portion may be grasped at the same time by the vehicle operator. By a single movement in drawing the handle member toward the operator, the trigger member releases the handle member so that the windshield is opened; and the handle member and the windshield are locked in adjusted position. Another advantage of the above structure is that by mounting the handle lever on the adjustable mounting member 50, the window regulating mechanism may be adjusted so that the windshield is in a tightly sealed position relative to the window opening when the windshield is closed.

Formal changes may be made in the specific embodiment of the invention described without departing from the spirit and substance of the invention, the scope of which is commensurate with the appended claims.

What is claimed is:

1. The combination with a pivotally mounted windshield frame and an opening in a vehicle body for receiving the frame, of an operating mechanism comprising an upstanding support member, a linkage mechanism lying in a substantially vertical plane which intersects the plane of the frame, said mechanism being pivotally connected to said support and pivotally connected to said frame, a lever member pivotally mounted on said support and pivotally and slidably mounted on said linkage mechanism, and means for releasably holding said lever member in various positions of adjustment.

2. The combination with a pivotally mounted windshield frame and an opening in a vehicle body for receiving the frame, of an operating mechanism comprising a support member, a linkage mechanism lying in a substantially vertical plane which intersects the plane of the frame, said linkage mechanism being pivotally connected to said support and pivotally connected to said frame, a lever member lying in a substantially vertical plane pivotally mounted on said support and pivotally and slidably mounted on said linkage mechanism, and means for releasably holding said lever member in various positions of adjustment.

3. The combination with a pivotally mounted windshield frame and an opening in a vehicle body for receiving the frame, of an operating mechanism comprising a support member, a linkage mechanism lying in a substantially vertical plane which intersects the plane of the frame, said linkage mechanism being pivotally connected to said support and pivotally connected to said frame, a lever member having a handle portion pivotally mounted on said support and pivotally and slidably mounted on said linkage mechanism, a handle member pivotally mounted on said lever member adjacent said handle portion, said handle member having means adapted to engage cooperating means on said support for releasably holding said lever member in various positions of adjustment.

4. A combination with a windshield frame and an opening in a vehicle body for receiving the frame, of an operating mechanism comprising a support member, a linkage mechanism pivotally connected to said support and pivotally connected to said frame, a lever member having a handle portion pivotally mounted on said support and pivotally and slidably mounted on said linkage mechanism, another handle member pivotally mounted on said lever adjacent said handle portion, a notched member mounted on said support, and means on said handle member adapted to cooperate with said notched member to releasably hold said lever member in various positions of adjustment.

5. The combination with a windshield frame and an opening in a vehicle body for receiving the frame, of an operating mechanism comprising a support member, a linkage mechanism lying in a substantially vertical plane pivotally connected to said support and pivotally connected to said frame, a lever member lying in a substantially vertical plane pivotally mounted on said support and pivotally and slidably mounted on said linkage mechanism, said lever member having a downwardly directed handle portion, a notched member mounted on said support, and a handle member pivotally mounted on said lever member adjacent said handle portion having means thereon adapted to cooperate with said notches to releasably hold said lever member in various positions of adjustment.

6. The combination with a windshield frame and an opening in a vehicle body for receiving the frame, of an operating mechanism comprising a support member, a linkage mechanism lying in a substantially vertical plane pivotally connected to said support and pivotally connected to said frame, an elongated mounting member pivotally mounted at one end to said support and adjustably mounted at its opposite end to said support, so that said member may be adjustably mounted on said support about its pivotal connection with said support, a lever member lying in a substantially vertical plane pivotally mounted on said mounting member and pivotally and slidably mounted on said linkage mechanism, said lever member having a downwardly directed handle portion, said mounting member having notches formed therein, a handle member pivotally mounted on said lever member adjacent said handle portion having means thereon adapted to cooperate with said notches to releasably hold said lever member in various positions of adjustment, and means resiliently urging said last named means into engagement with said notches.

7. The combination with a windshield frame and an opening in a vehicle body for receiving the frame, of an operating mechanism comprising a support member, an elongated mounting member having a portion thereof in the shape of a segment, said mounting member having one end pivotally connected to said support and having its opposite end slidably connected to said support, said segment portion being formed with notches therein, a linkage mechanism lying in a substantially vertical plane pivotally connected to said support and pivotally connected to said frame, a lever member lying in a substantially vertical plane pivotally mounted on said mounting member and pivotally and slidably mounted on said linkage mechanism, said lever member having a downwardly directed handle portion, a handle member pivotally mounted on said lever member adjacent said handle portion having means thereon adapted to cooperate with said notches to releasably hold said lever member in various positions of adjustment, and means for resiliently urging said last named means into engagement with said notches.

JOSEPH B. MENTON.
BERNARD W. BENZ.